V. A. FYNN.
ALTERNATING CURRENT MOTOR.
APPLICATION FILED NOV. 19, 1909.

994,381.

Patented June 6, 1911.

3 SHEETS—SHEET 1.

Commuted Winding

WITNESSES:
L. L. Mead.
W. A. Alexander

INVENTOR
Valère A. Fynn
BY
Fowler & Haffman
ATTORNEYS

V. A. FYNN.
ALTERNATING CURRENT MOTOR.
APPLICATION FILED NOV. 19, 1909.

994,381.

Patented June 6, 1911.
3 SHEETS—SHEET 3.

WITNESSES:
L. L. Mead.
W. A. Alexander.

INVENTOR
Valère A. Fynn.
BY
Fowler Huffman
ATTORNEYS

UNITED STATES PATENT OFFICE.

VALÈRE ALFRED FYNN, OF LONDON, ENGLAND.

ALTERNATING-CURRENT MOTOR.

994,381.   Specification of Letters Patent.   Patented June 6, 1911.

Application filed November 19, 1909. Serial No. 528,893.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to motors having at least two windings on the induced member and a magnetic bridge or shunt between said two windings.

The object of my invention is to make said magnetic shunt as fully effective as possible at starting and as fully ineffective as possible under normal running conditions.

In a concurrent application, Serial No. 506,955, filed July 10, 1909, I have disclosed a magnetic shunt inductively responsive to the flux threading it. In that application the magnetic material of the magnetic shunt is so chosen and disposed as to be the seat of the currents induced by the flux threading said magnetic shunt. According to the present invention I surround the magnetic shunt with a closed circuit of suitable conductivity and so placed that the flux threading the magnetic shunt will induce screening currents in said closed circuit. I may apply this invention to a magnetic shunt which is or is not inductively responsive in the sense of the aforesaid concurrent application.

Figure 1:
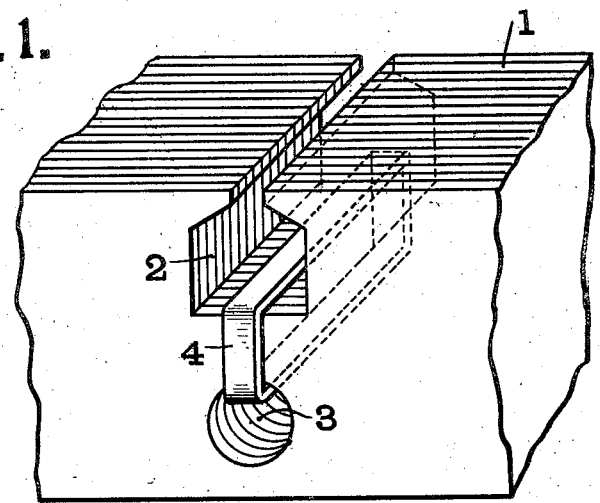
Figure 2:
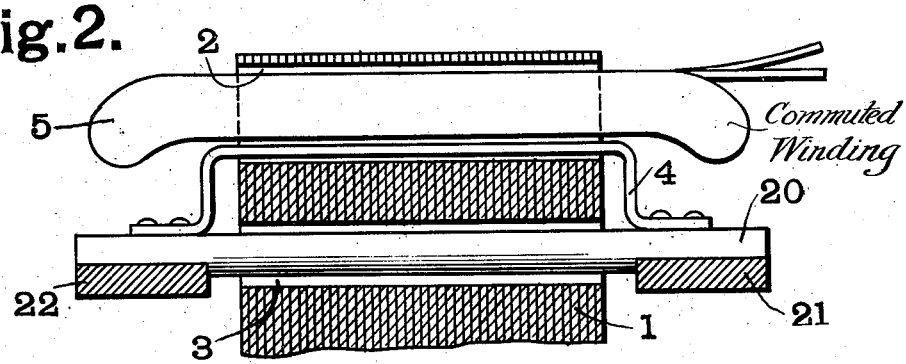
Figure 3:
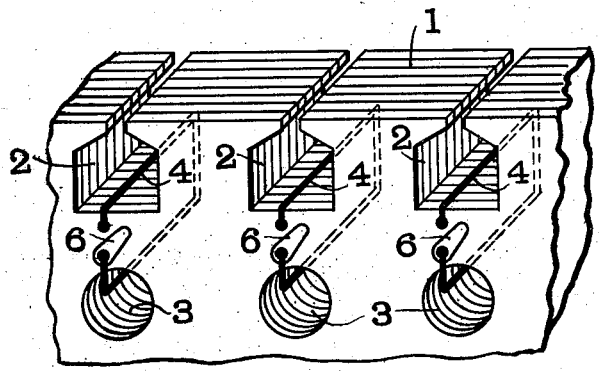
Figure 4:
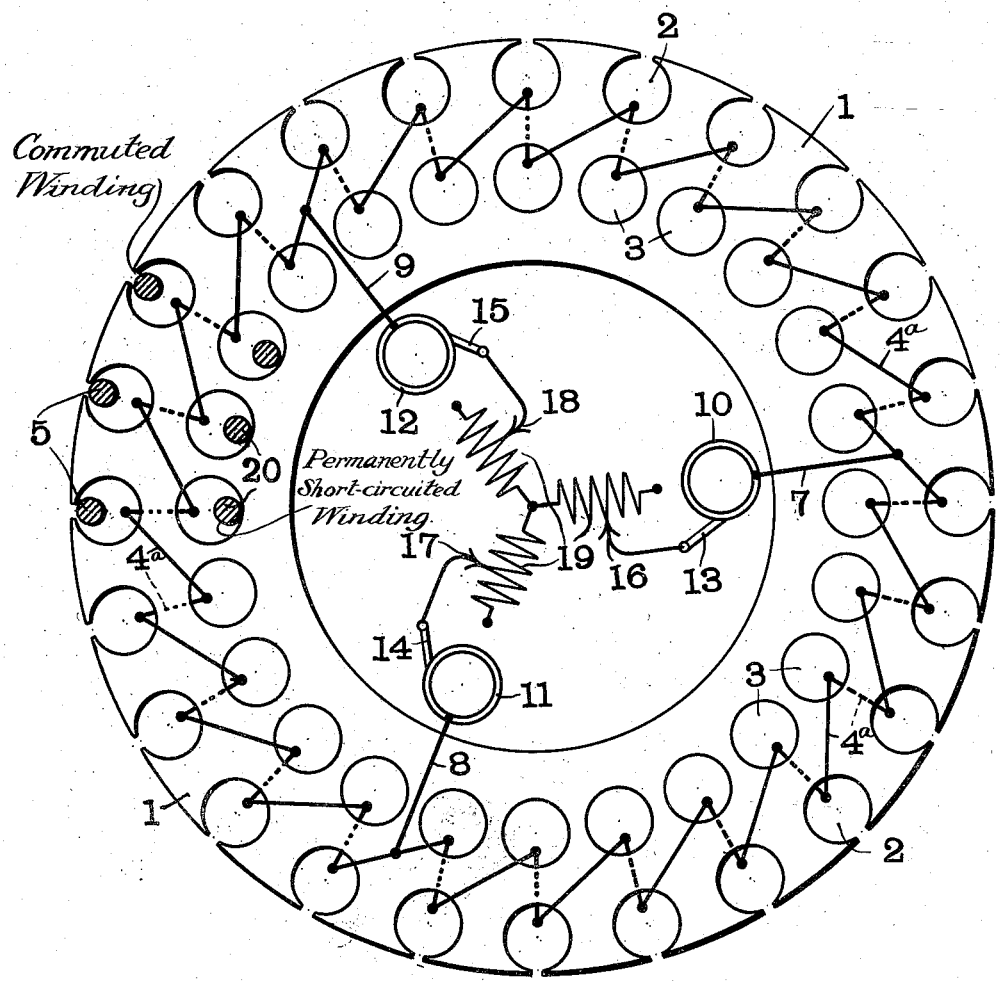
Figure 5:
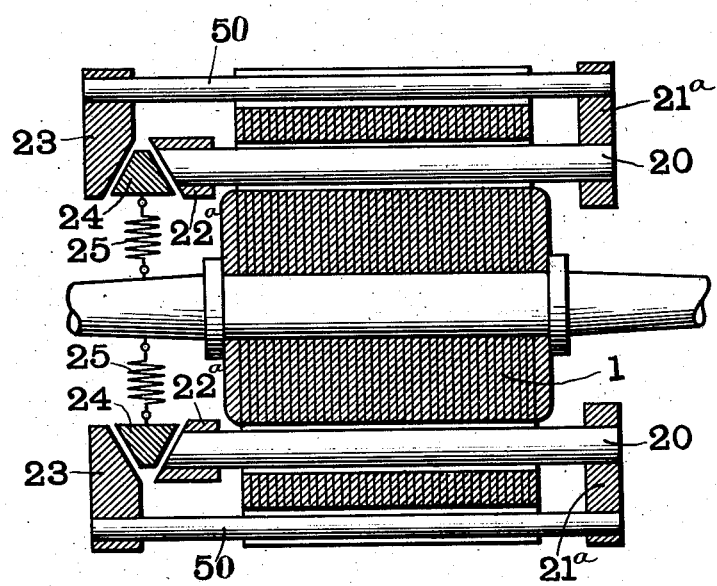
Figure 6:
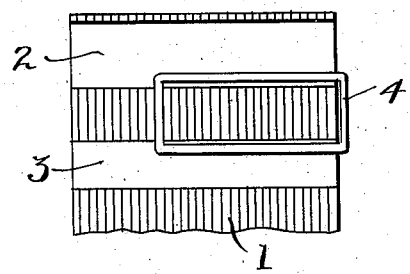

In the accompanying drawings, Figure 1 shows one form of a permanently closed circuit embracing the magnetic shunt between two windings disposed in the openings of the induced member; Fig. 2 shows another form of such a circuit; Fig. 3 discloses means for independently controlling said closed circuits; Fig. 4, shows means for collectively controlling said closed circuits. In Fig. 5 the conductors of the two rotor windings separated by the magnetic shunt form part of the circuits adapted to be automatically closed about the said magnetic shunts. In Fig. 6 the closed circuit embraces only part of the magnetic shunt.

Referring to Fig. 1, the induced member, which in such machines is usually the rotor, is shown at 1 and is supposed to be laminated in the usual manner. A set of open slots 2 placed close to the periphery are adapted to accommodate one of the windings to be disposed on the induced member. A set of holes 3 in the rotor laminations are adapted to accommodate a second winding to be disposed on the induced member. According to this invention I provide a circuit 4 inclosing the magnetic bridge or shunt between the slots 2 and 3. This loop may inclose the whole of that bridge or only a part of it as shown in Fig. 6. In Fig. 1 it is shown as being permanently short-circuited. The resistance of this closed circuit should not be too low.

In Fig. 2 which shows a transverse section through the center of slots or holes 2 and 3 of the induced member 1, the outer winding 5 disposed in the slots 2 is supposed to be a commuted winding; the inner winding disposed in the holes 3 is supposed to be a squirrel cage winding with the end rings 21 and 22. The bar 20 of the squirrel-cage forms part of the circuit inclosing the magnetic shunt between slot 2 and holes 3.

In Fig. 3 the circuits 4 inclosing the magnetic shunts between the slots 2 and 3 are provided with switches 6 which can be closed at any desired stage of the starting performance or the normal operation of the machine. These switches can be closed in any desired manner.

In Fig. 4 the closed circuits embracing the magnetic shunts between the set of slots 2 and the set of holes 3 are all connected in series, the result being a closed winding $4^a$ resembling a Gramme ring winding. The connections are so made that no currents will flow in that winding until two or more points thereof are interconnected. In this figure which is supposed to represent a two-pole rotor three equidistant points of $4^a$ are connected by means of the conductors 7, 8, 9 to slip-rings 10, 11, 12, which may be mounted on the rotor shaft and are connected by way of the brushes 13, 14, 15 to a three-leg impedance or pure resistance 19. Contacts 16, 17, 18 enable a regulation of the amount of resistance between the brushes. At starting the resistance is preferably infinite and may be reduced as the motor gathers speed or the slip rings may be directly short circuited after the motor has reached a sufficient speed. The outer slots 2 may contain a commuted winding indicated at 5 and the inner slots or holes may contain a winding 20 permanently closed on itself. Instead of a commuted winding in slots 2 a squirrel cage or the like may be disposed therein. In such a case the outer winding permanently closed on itself may be given a high resistance for starting purposes, whereas the inner permanently closed winding may have a very low resistance. It will be understood that the arrangement shown in Fig. 4 will work the better the more points of winding 4ᵃ are short-circuited.

In Fig. 5 the rotor is provided with two radially displaced squirrel cages, the conductors of the outer one are marked 50, those of the inner, 20. All the conductors of both squirrel cages are connected at one end to a common short-circuiting ring 21ᵃ. At the other end each squirrel cage has an independent short-circuiting ring, 23 for 50 and 22ᵃ for 20. Wedge-shaped segments 24 are so disposed as to come into contact with 23 and 22ᵃ after a sufficient speed has been reached. These short-circuiting wedges are kept out of contact with 23 or 22ᵃ when at rest by springs 25. Instead of short-circuiting 22ᵃ and 23 automatically as shown, this can be done by hand by connecting 22ᵃ to one slip-ring and 23 to another similarly to the modification already illustrated in Fig. 4.

A motor embodying this invention can be arranged to operate with single phase or polyphase currents, it being only necessary to suitably choose the two windings disposed on the induced member and separated by the magnetic shunt and constitute the primary circuits accordingly.

Having fully described my invention, what I claim as new and desire to secure by Letters Patent of the United States is:

1. A rotor provided with two windings, a bridge of magnetic material separating said windings, and means for permitting a current to flow around at least part of said bridge.

2. A rotor provided with a commuted winding and a squirrel-cage winding, a bridge of magnetic material separating said windings, and means for permitting a current to flow around at least part of said bridge.

3. A rotor provided with a commuted winding and a squirrel-cage winding, a bridge of magnetic material separating said windings, a circuit surrounding said bridge, and means for controlling the current flowing in said circuit.

4. A rotor provided with two radially displaced sets of openings for the reception of windings, a winding in each set of openings, and a circuit around the magnetic material lying between each pair of radially displaced openings.

In testimony whereof, I have hereunto set my hand and affixed my seal in the presence of the two subscribing witnesses.

VALÈRE ALFRED FYNN. [L. s.]

Witnesses:
E. E. HUFFMAN,
ELIZABETH BAILEY.